United States Patent [19]

Asplund

[11] 4,360,864

[45] Nov. 23, 1982

[54] VOLTAGE DIVIDER FOR A THYRISTOR VALVE CONTROL CIRCUIT

[75] Inventor: Gunnar Asplund, Ludvika, Sweden

[73] Assignee: ASEA Aktiebolag, Västerås, Sweden

[21] Appl. No.: 206,204

[22] Filed: Nov. 12, 1980

[30] Foreign Application Priority Data

Dec. 20, 1979 [SE] Sweden .............................. 7910516

[51] Int. Cl.³ .............................................. H02M 1/08
[52] U.S. Cl. .................................... 363/68; 307/252 Q
[58] Field of Search ....................... 363/51, 54, 57, 68; 307/252 L, 252 Q

[56] References Cited

U.S. PATENT DOCUMENTS 3,739,198 6/1973 Clements ........................ 307/252 Q
3,794,908 2/1974 Lindbloom et al. ................... 363/68

Primary Examiner—William H. Beha, Jr.
Attorney, Agent, or Firm—Pollock, Vande Sande & Priddy

[57] ABSTRACT

A power converter includes a plurality of thyristors, each of which is controlled by a control circuit. A multi-section voltage divider is connected in parallel with a thyristor and provides the control circuit with power as well as means for measuring voltage across the thyristor. The present voltage divider components minimize the space required and cost of fabrication.

10 Claims, 2 Drawing Figures

VOLTAGE DIVIDER FOR A THYRISTOR VALVE CONTROL CIRCUIT

FIELD OF THE INVENTION

The present invention relates to a voltage divider connection for connection in parallel with a thyristor and comprising voltage divider elements for power supply of the control circuits of the thyristor as well as voltage divider elements for forming a measuring voltage corresponding to the thyristor voltage.

BRIEF DESCRIPTION OF THE PRIOR ART

In switches having a plurality of series-connected thyristors, each thyristor is often provided with a control device. The main task of said control device is to fire the thyristor, but it may also have other functions, for example to deliver an indication signal indicating whether the control device and/or the thyristor is in working order or not. Normally, firing takes place in response to a control pulse supplied to the control device, but often the control device is designed so that, in addition, the thyristor is automatically triggered as soon as its off-state voltage reaches a predetermined upper limit value.

To be able to perform these functions, it is required that the control device is provided with supply voltage, which can suitably be obtained in a known manner with the aid of a voltage divider connected in parallel with the thyristor. Further, it is required that the control device is supplied with a signal which is proportional to the voltage across the thyristor. This signal is also suitably obtained by means of a voltage divider. Since the supply and measuring voltages must not affect each other, two separate voltage dividers have hitherto been used, one for supply of the control device and one for measuring the thyristor voltage. Since both supply and measuring must function at frequencies down to zero (direct voltage), both voltage dividers have to contain purely resistive current paths between the anode and cathode of the thyristor. Each voltage divider must then include at least one high voltage resistor, which takes up the major part of the thyristor voltage. Since the voltage divider cannot have too high a resistance, the power generated in this resistor will be relatively high, typically of the order of magnitude of a few hundred watts. Resistors designed for high voltage as well as high power, are expensive, bulky and powerconsuming.

Normally, the voltage dividers also comprise capacitors, of which at least one in each voltage divider must be designed for the high thyristor voltage. Therefore, these elements are also bulky and expensive.

BRIEF DESCRIPTION OF THE PRESENT INVENTION

The invention aims to provide a voltage divider for thyristor switches as discussed, in which the number of components designed for high voltage is reduced to a minimum, thus making it possible to considerably reduce the space requirement, price and power consumption of the voltage divider.

The above-mentioned objects and advantages of the present invention will be more clearly understood when considered in conjunction with the accompanying drawings, in which:

DETAILED DESCRIPTION OF THE INVENTION

Figure 1:
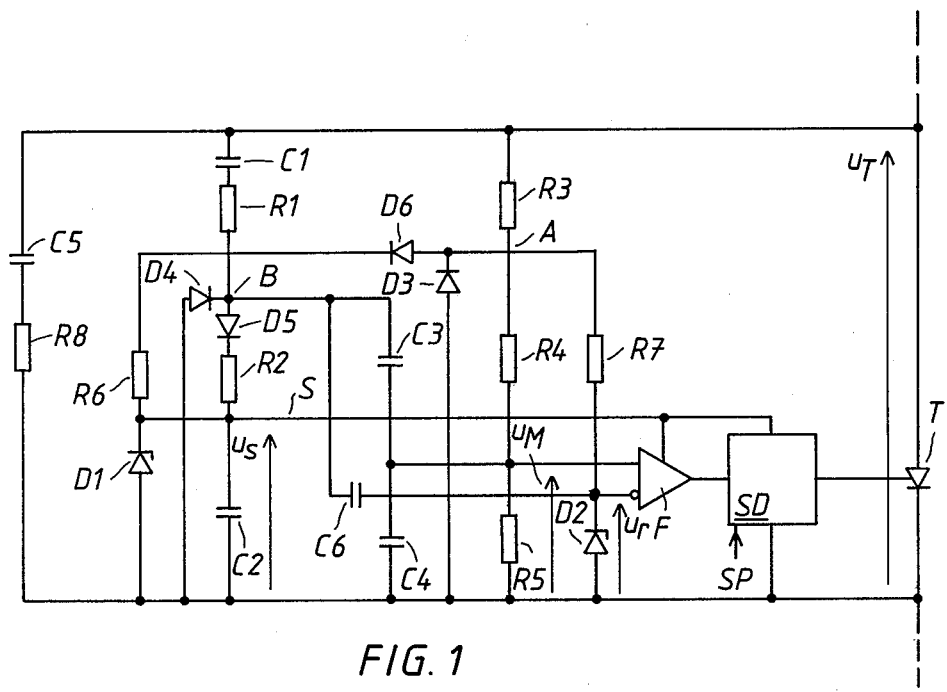
FIG. 1 is a schematic diagram of a first embodiment of the present invention.

Referring to FIG. 1, the thyristor T is one of a number of series-connected thyristors included in a converter switch. The thyristor has a control device SD, which, upon receipt of a control pulse SP delivers a current pulse to the gate of the thyristor for the firing thereof. A comparator F is supplied with a signal $u_M$ corresponding to the thyristor voltage $u_T$ as well as with a reference voltage $u_r$. If the thyristor voltage exceeds the level determined by $u_r$, the comparator F delivers a signal to the control device SD for firing of the thyristor independently of the control pulse SP. The measuring signal $u_M$ may also (or alternatively) be used for other purposes in the control device, for example for allowing firing of the thyristor only if the thyristor voltage exceeds a predetermined minimum value, or for the purpose of supervision.

The thyristor T is provided with a voltage divider connection to achieve a uniform voltage division between all the thyristors of the converter switch, for supply of control devices belonging to the thyristor and other electronic equipment as well as for measuring the thyristor voltage. The voltage division between the thyristors during normal operation is dealt with in a known manner by an RC circuit connected in parallel with each thyristor, said circuit consisting of capacitor C5 and resistor R8.

For supply of the control device SD of the thyristor and comparator F and for measuring the thyristor voltage, according to the invention there is arranged a voltage divider connection consisting of a high frequency portion and a low frequency portion.

The high frequency portion consists of a capacitor C1 and two resistors R1 and R2 and reduces the high frequency components of the thyristor voltage $u_T$ from, for example, one or a few thousand volts to a few hundred volts (the voltage at point B). In case of steep (high frequency) transient voltages, a rapid charging of the capacitor C2 is obtained by means of the above-mentioned components, said capacitor achieving energy storage for the control circuits of the thyristor which are supplied from the capacitor via a bus line S. The supply voltage is limited to the desired level (e.g., ten to thirty volts) by a Zener diode D1.

The voltage at point B is reduced to a level suitable for the comparator F (a few volts) by means of capacitors C3 and C4. Since the voltage at point B at higher frequencies is much higher than the supply voltage $u_S$, the voltage at point B is, with good precision, proportional to the thyristor voltage $u_T$ and may, via the voltage divider C3, C4, be used as a measure of the thyristor voltage.

The low frequency portion of the voltage divider connection consists of the resistors R3, R4 and R5. These are designed so that point A is positioned at a voltage level which is much higher than voltage $u_M$ across resistor R5. For example, the voltage at point A may be a few hundred volts whereas the voltage $u_M$, as mentioned above, amounts to a few volts.

Because point A is positioned at a much higher voltage than $u_M$, the voltage at point A may be used for providing low frequency supply, via a resistor R6, to the bus line S without interfering with the proportionality between $u_T$ and $u_M$ to any mentionable degree. The voltage at point A is also used for generating a reference voltage $u_r$ to the comparator F with the aid of a resistor R7 and a Zener diode D2.

The point of connection between Zener diode D2 and resistor R7 is connected to junction point B via a capacitor C6. In this way a reference voltage $u_r$ may be obtained also when the thyristor voltage $u_T$ is negative but has positive rate of change.

The diodes D5 and D6 connected in series with the resistors R2 and R6 prevent the capacitor C2 from being discharged at negative thyristor voltage. The diode D4 connected between the cathode of the thyristor and the junction point B enables recharging of the capacitor C1. The diode D3 connected between the cathode of the thyristor and the junction point A provides point A with a defined potential, equal to the cathode potential of the thyristor, when the thyristor voltage is negative.

The resistive voltage divider R3-R4-R5 provides, in addition to the above-mentioned functions, a uniform voltage distribution across the thyristors of the converter switch at low frequencies and at a pure direct voltage across the thyristor.

By a suitable choice of component values for the connection, the measuring signal $u_M$, at an applied step voltage across the thyristor, may instantaneously reach a higher value and thereafter, with a suitable time constant, drop towards the value determined by the resistive voltage divider R3-R4-R5. In this way firing of the thyristor is obtained by means of the comparator F at a lower voltage in case of steep overvoltages, which results in lower voltage stresses being applied to the thyristor.

In the voltage divider connection now described, only the single high power resistor R3 and only the single high voltage capacitor C1 are required. This leads to a considerable reduction of the price, space requirement and power consumption of the circuit. Since a typical thyristor switch for high voltage may comprise hundreds of series-connected thyristors, the benefit is substantial. Since all the power losses have to be dissipated, there is further obtained a considerable saving as regards the cooling system of the valve.

The resistor R2 in the figure may alternatively be replaced with a capacitor or with a combination of resistors and capacitors. The resistors R1 (and also R2) give a limitation of the current through the high frequency voltage divider at high frequencies (steep transient voltages). In the figure and the description all the voltages are referred to the cathode of the thyristor.

The low frequency voltage divider may possibly be made to operate with such a large band width that the measuring signal from this voltage divider depicts the thyristor voltage with sufficient accuracy also at higher frequencies. In this case, if there is arranged a high frequency voltage divider for supply of the control circuits, said voltage divider does not have to be arranged for measuring the thyristor voltage as well. However, more accurate measurements at high frequencies are obtained if the high frequency voltage divider is arranged for measuring as well.

Figure 2:
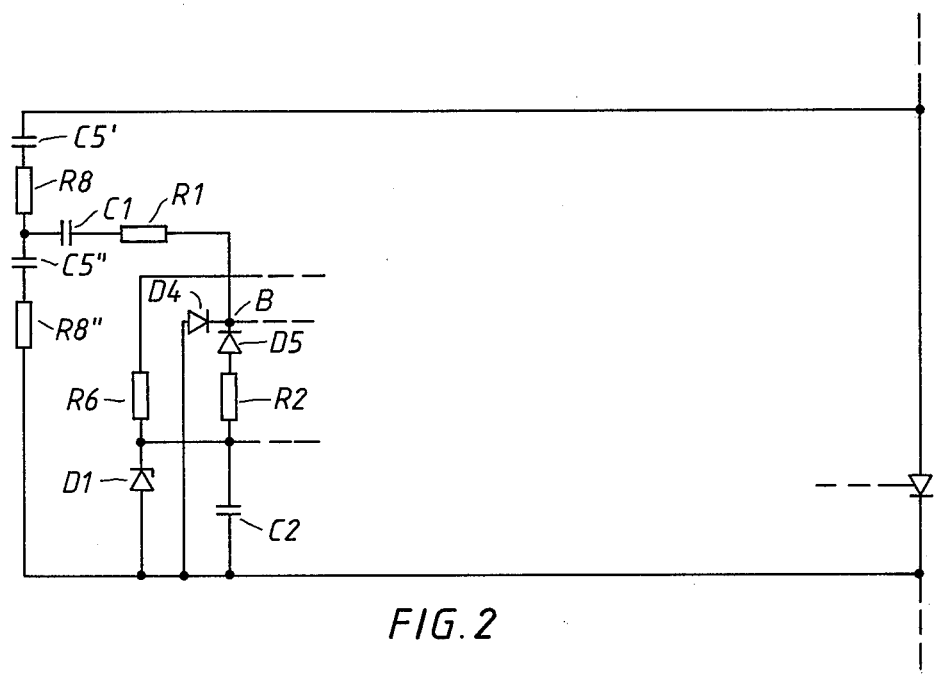
FIG. 2 is a schematic diagram of a second embodiment of the invention in which a high frequency voltage divider is subjected to lower voltages.

The voltage divider C5-R8 in FIG. 1 must often be made of several series-connected elements to obtain sufficient voltage capability. In this case the high frequency voltage divider may be connected to a tap on the voltage divider C5-R8 instead of to the thyristor anode as in FIG. 1. FIG. 2 shows how the voltage divider C5-R8 is made with two capacitors C5' and C5" and two resistors R8' and R8". The high frequency voltage divider is connected to point C between R8' and C5" and is only subjected to approximately half the thyristor voltage, which means a reduction of the size, price and power losses of the components included (primarily C1 and R1). If the elements of the voltage divider C5-R8 are divided into more than two units of each kind, a correspondingly higher degree of reduction of the voltage stress on the high frequency voltage divider may be obtained. In other respects, the connection according to FIG. 2 corresponds to the connection according to FIG. 1.

It should be understood that the invention is not limited to the exact details of construction shown and described herein for obvious modifications will occur to persons skilled in the art.

I claim:

1. In a converter valve having at least one thyristor and a control circuit for firing the thyristor, a voltage distribution circuit comprising:

voltage dividing means, having a plurality of interconnected sections, connected in parallel across the thyristor;

means connected between preselected points of a first section of the voltage divider for measuring a voltage thereacross which is substantially proportional to the voltage across the thyristor; and means connected between points of a second preselected section of the divider for connection of a supply voltage to the control circuit;

wherein the first section of the voltage divider is connected for low frequency voltage supply of the control circuit and wherein a third section of the voltage divider is connected in circuit with the first and second sections, the third section connected for high frequency voltage supply of the control circuit, the third section having a junction point therein for permitting measurement of high frequency voltage of the thyristor.

2. The circuit of claim 1 wherein the third section includes an impedance connected between a first output terminal of the thyristor and the junction point, the impedance assuming the major portion of the thyristor voltage.

3. In a converter valve having a plurality of series connected thyristors, each thyristor having a control circuit for firing the thyristor, a voltage distribution circuit comprising:

for each thyristor a voltage dividing means connected in parallel with the thyristor, each of said voltage dividing means comprising (a) a first voltage divider (R3, R4, R5) section connected in parallel with the thyristor to derive from low frequency components, including a direct voltage component, of the thyristor voltage a supply voltage to the control circuit and a measuring voltage substantially proportional to the thyristor voltage, first impedance means (R6) connecting an intermediate point (A) of said first voltage divider section to a supply voltage bar for said control circuit, first measuring voltage divider means (R4, R5) connected to said intermediate point (A) for deriving said measuring voltage, (b) a second voltage divider section (C1, R1, R2, C2, C3, C4) connected in parallel with the thyristor to derive from high frequency components of the thyristor voltage a supply voltage for the control circuit, means connecting said second voltage divider section to said supply voltage bar.

4. The circuit of claim 3, wherein the first voltage divider section comprises a resistor (R3) connected between a first main electrode of the thyristor and said intermediate point (A), said resistor being arranged to take up the main part of the thyristor voltage, said first measuring voltage divider means (R4, R5) being connected between said intermediate point (A) and the second main electrode of the thyristor.

5. The circuit of claim 3, wherein the first voltage divider section (R3, R4, R5) is dimensioned so that the voltage across the first measuring voltage divider means (R4, R5) is considerably higher than the supply voltage ($u_S$) to the control circuits of the thyristor and the measuring voltage ($u_M$).

6. The circuit of claim 3, wherein said second voltage divider section has an intermediate point (B), second impedance means (R2) connecting said intermediate point (B) to the supply bar (S), a second measuring voltage divider (C3, C4) for deriving the measuring voltage from high frequency components of the thyristor voltage being connected to said intermediate point (B).

7. The circuit of claim 6, wherein said second voltage divider section comprises at least partially capacitive impedance elements (R1, C1) arranged between a first main electrode of the thyristor and said intermediate point (B), said impedance elements being arranged to take up the main part of the thyristor voltage, said second measuring voltage divider (C3, C4) being connected between said intermediate point (B) and the second main electrode of the thyristor.

8. The circuit of claim 6, wherein the second voltage divider section (C1, R1, R2, C3, C4) is dimensioned so that the voltage across the second measuring voltage divider (C3, C4) is considerably higher than the supply voltage ($u_S$) to the control circuits of the thyristor and the measuring voltage ($u_M$).

9. The circuit of claim 6, wherein a further voltage divider (C5', C5'', R8', R8'') is connected in parallel with the thyristor, said second voltage divider section (C1, R1, R2, C3, C4) being connected to an intermediate point (C) on the additional voltage divider.

10. The circuit of claim 3, wherein the measuring voltage ($u_M$) at a step voltage applied across the thyristor instantaneously assumes a higher value than the value which is determined only by the low frequency voltage divider.

* * * * *